(12) United States Patent
Rajarajan et al.

(10) Patent No.: US 6,363,394 B1
(45) Date of Patent: Mar. 26, 2002

(54) AUTO-GENERATION OF TABLE NEIGHBORHOODS

(75) Inventors: Vij Rajarajan, Issaquah; Casey L. Kiernan, Kirkland, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/272,016

(22) Filed: Mar. 18, 1999

(51) Int. Cl.$^7$ .............................................. G06F 17/30
(52) U.S. Cl. ............................ 707/102; 707/4; 707/103
(58) Field of Search ........................... 707/1, 2, 4, 102, 707/101, 103, 203, 204; 705/35; 345/334

(56) References Cited

U.S. PATENT DOCUMENTS

| | | | |
|---|---|---|---|
| 4,961,139 A | * 10/1990 | Hong et al. ..................... 707/1 |
| 5,428,776 A | * 6/1995 | Rothfield ........................ 707/1 |
| 5,495,567 A | * 2/1996 | Iizawa et al. ............... 345/334 |
| 5,752,018 A | * 5/1998 | Sheffield ........................ 707/2 |
| 5,778,390 A | * 7/1998 | Nelson et al. ............... 707/204 |
| 5,950,210 A | * 9/1999 | Nelson ........................ 707/203 |
| 6,085,198 A | * 7/2000 | Skinner et al. ............. 707/103 |
| 6,112,199 A | * 8/2000 | Nelson ........................... 707/4 |

OTHER PUBLICATIONS (IEEE publication Mar. 1999) Witten et al. discloses text mining a new frontier for lossless compression, pp. 198–207 from data compression conference 1999.*

* cited by examiner

Primary Examiner—Diane Mizrahi
(74) Attorney, Agent, or Firm—Woodcock Washburn LLP (57) ABSTRACT

A system for automatically generating table neighborhoods comprises a database designer which automatically generates a database diagram for a selected table. The database designer automatically compiles a set of tables having the desired relation to a selected table. The desired level of relation may be several levels removed from the selected table, in which case, the database designer searches multiple levels for tables to be included in the database diagram. Thereafter, the database designer gathers format data for the selected table and the set of tables having the desired relation to the selected table. Finally, the database designer displays the selected table, the tables in the set of tables having the desired relation to the selected table, and the relationships between these tables.

21 Claims, 10 Drawing Sheets

AUTO-GENERATION OF TABLE NEIGHBORHOODS

TECHNICAL FIELD

The present invention relates generally to database systems, and more particularly to a system for automatically generating database diagrams depicting neighborhoods of database tables related to a selected database table.

BACKGROUND OF THE INVENTION

A relational database is a collection of data that is logically organized in related two-dimensional tables of columns and rows. A database may contain numerous tables each of which may have several logical relationships to other tables in the database.

For software engineers developing software to interact with a database, as well as individuals involved with designing and/or maintaining a database, it is often very useful to view a graphical representation of the database with which they are working. A graphical representation of a database, frequently referred to as a "database diagram" depicts database tables as well as the relationships that exist between tables. A database diagram helps developers visualize structures of tables and relationships and thereby provides insights into the most efficient method of accessing a desired set of data and modifications that may need to be made to the database. Indeed, one of the first tasks a software developer will frequently perform when assigned to a new project is to view the database diagram for the database to which they will be developing.

Databases are frequently very complex and may contain hundreds of tables with hundreds of inter-relationships. A database diagram reflects the complexity and size of the underlying database. Indeed, for many complex databases the related database diagram cannot be viewed on one computer screen or printed on a single sheet of paper. Rather, viewing a complex database diagram on-line often requires paging between numerous screens and a printout of a database diagram may cover an entire wall.

Thus, due to the number of database tables and the complexity of relationships between tables, database diagrams can be unwieldy and confusing. For this reason, it is often useful to view selected portions of a database diagram. Specifically it is useful to view a specific database table and those tables that are related to the specific table. For example, a developer building an application related to an organization's employees may desire to focus attention on only those database tables related to employees. The tables related to employees are those that will most frequently be accessed and it is the structure and relationships of these tables that is most important for the developer to critically understand. Therefore, in such a situation, a developer may wish to have a database diagram depicting the "neighborhood" of tables related to employees.

Existing database diagramming tools provide the capability to build a database diagram for an entire database. In order to view only a portion of the database diagram for a database, such as a table neighborhood, however, it is necessary to build the diagram for the entire database and thereafter manually remove the tables and relationships that are not desired. The task of removing tables is manually taxing and time consuming, and introduces human error into the generation of a database diagram.

Thus, there is a need for a database system which provides the capability to automatically build database diagrams featuring only selected neighborhoods of an entire database. Specifically, there is a need for a database system wherein a specific table may be selected and a database diagram automatically generated featuring the selected table and all database tables having a direct relation to the selected table. Preferably the system also provides the capability to view in a database diagram additional tables that have indirect relationships, i.e. tables related to any tables having a direct relation to the selected table. Additionally, the system should provide the capability to select two or more tables for which it is desired to have database diagrams automatically generated.

SUMMARY OF THE INVENTION

Briefly, the present invention is directed toward remedying these shortcomings by automatically generating database diagrams for selected neighborhoods of tables.

According to the invention, a database management system comprises a "database designer." The database designer provides the capability for users to selectively define the parameters for the database diagram that they wish to see. More specifically, the database designer allows users to select a table and specify a level of relation for related tables which are also desired to be included in the database diagram. A user may specify to include in the database diagram tables that are several relationships removed from the selected table. Upon selection of these parameters, the database designer automatically displays the selected database table and related database tables having the selected level of relation with the selected database table.

According to another aspect of the invention, there is provided a method of creating a database diagram for a selected database table. The method for creating a database diagram comprises searching a database for tables having a relationship to a selected table. This step may entail searching several levels to compile a set of tables including tables that are several relations removed from the selected table. Thereafter, format data about the selected table and each table having the desired relationship to the selected table is retrieved. Finally, a graphical representation is displayed comprising the following elements: the selected table, each table falling with in the desired relationship to the selected table, and relationships existing there between.

BRIEF DESCRIPTION OF THE DRAWINGS

Other features of the invention are further apparent from the following detailed description of presently preferred exemplary embodiments of the invention taken in conjunction with the accompanying drawings, of which.

DETAILED DESCRIPTION OF THE INVENTION

Overview

The present invention provides a database management system capable of generating a database diagram of a selected database table and tables related to the selected table, i.e. a table neighborhood. The database management system compiles from the database a list of tables having a relationship to the selected table. Thereafter, the database management system retrieves from the database, data regarding the selected table and each table in the list of tables having a relationship to the selected table. Finally, a database diagram is displayed of the selected table along with the tables having a relationship with the selected table.

Prior to explaining the details of the invention, it is useful to provide a description of a suitable exemplary environment in which the invention may be implemented.

EXEMPLARY OPERATING ENVIRONMENT

1. A Computer Environment

Figure 1:
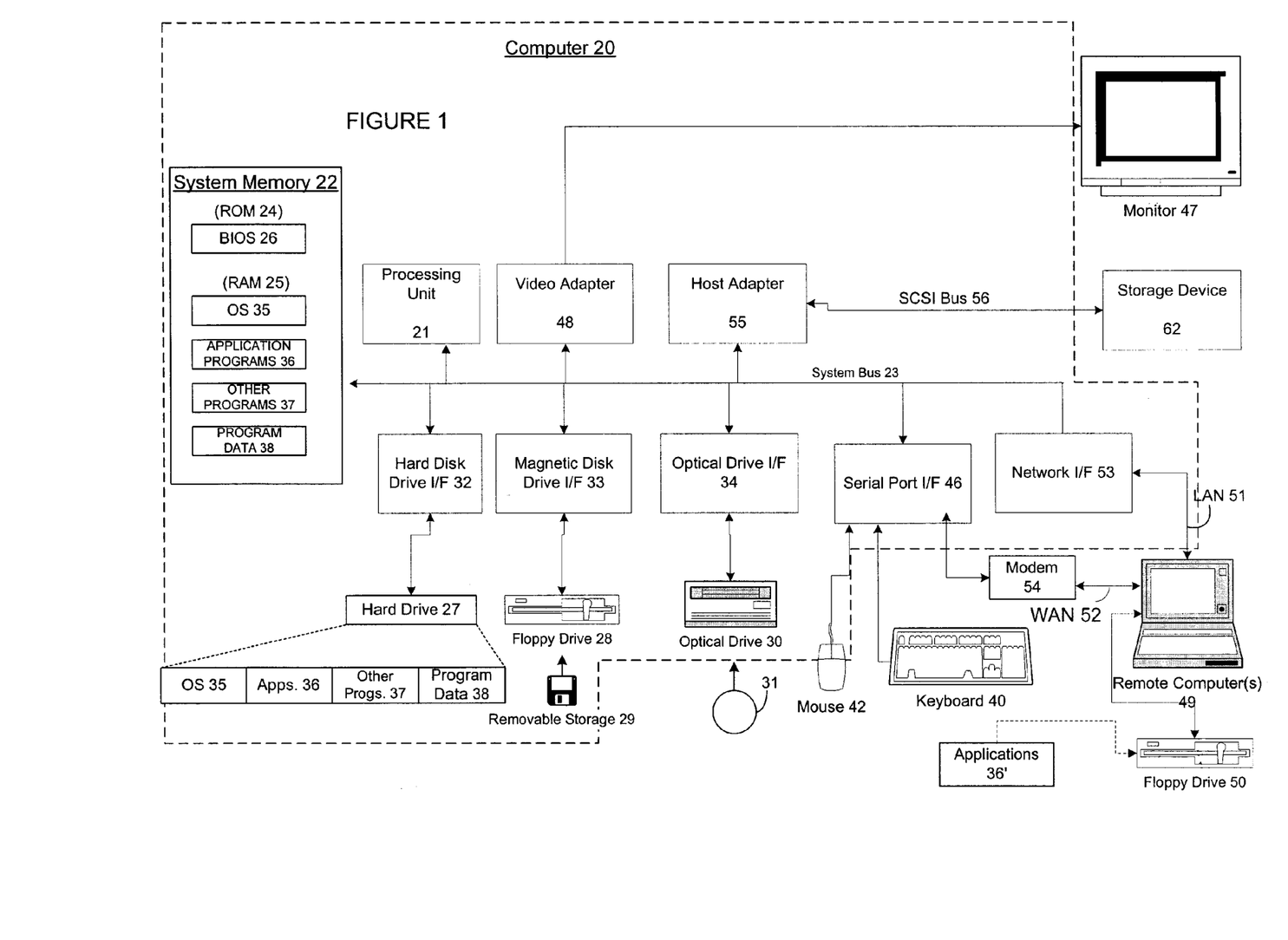
FIG. 1 is a block diagram representing a computer system in which aspects of the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a workstation or server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCS, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment. Further, as used herein, the term "computer readable medium" includes one or more instances of a media type (e.g., one or more floppy disks, one or more CD-ROMs, etc.).

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

2. A Network Environment

Figure 2:
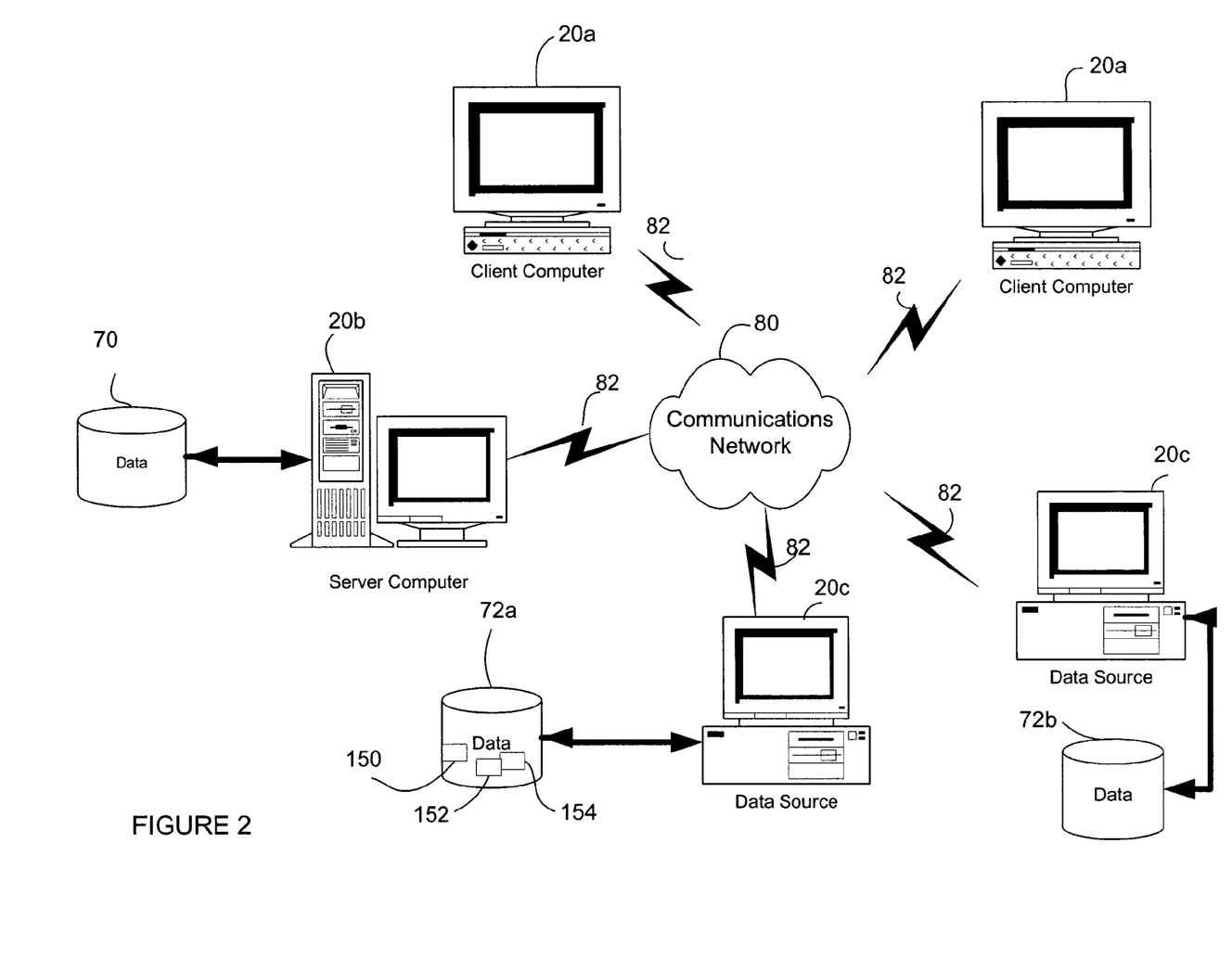
FIG. 2 is schematic diagram representing a network in which aspects of the present invention may be incorporated.

FIG. 2 illustrates an exemplary network environment in which the present invention may be employed. Of course, actual network and database environments can be arranged in a variety of configurations; however, the exemplary environment shown here provides a framework for understanding the type of environment in which the present invention operates.

The network may include client computers 20a, a server computer 20b, data source computers 20c, and databases 70 and 72. The client computers 20a and the data source computers 20c are in electronic communication with the server computer 20b via communications network 80, e.g., the Internet. Client computers 20a and data source computers 20c are connected to the communications network by way of communications interfaces 82. Communications interfaces 82 can be any one of the well-known communications interfaces such as Ethernet connections, modem connections, and so on.

Server computer 20b provides management of database 70 by way of database server system software, described more fully below. As such, server 20b acts as a storehouse of data from a variety of data sources and provides that data to a variety of data consumers.

In the example of FIG. 2, data sources are provided by data source computers 20c. Data source computers 20c communicate data to server computer 20b via communications network 80, which may be a LAN, WAN, Intranet, Internet, or the like. Data source computers 20c store data locally in databases 72a, 72b, which may be relational database servers, excel spreadsheets, files, or the like. For example, database 72a shows data stored in relational database tables 150, 152, and 154 which are described below with reference to FIG. 3. The data provided by data sources 20c may be combined and stored in a large database such as a data warehouse maintained by server 20b.

Client computers 20a that desire to use the data stored by server computer 20b can access the database 70 via communications network 80. Client computers 20a request the data by way of SQL queries (e.g., update, insert, and delete) on the data stored in database 70.

3. Databases Generally

A database is a collection of related data. In one type of database, a relational database, data is organized in a two-dimensional column and row form called a table. A relational database typically includes multiple tables. A table may contain zero or more records and at least one field within each record. A record is a row in the table that is identified by a unique numeric called a record identifier. A field is a subdivision of a record to the extent that a column of data in the table represents the same field for each record in the table. A database generally will also include associative structures. An example of an associative structure is an index, typically, but not necessarily, in a form of B-tree or hash index. An index provides for seeking to a specific row in a table with a near constant access time regardless of the size of the table. Associative structures are transparent to users of a database but are important to efficient operation and control of the database management system.

A database management system (DBMS), and in particular a relational database management system (RDBMS) is a control system that supports database features including, but not limited to, storing data on a memory medium, retrieving data from the memory medium and updating data on the memory medium.

Figure 3:
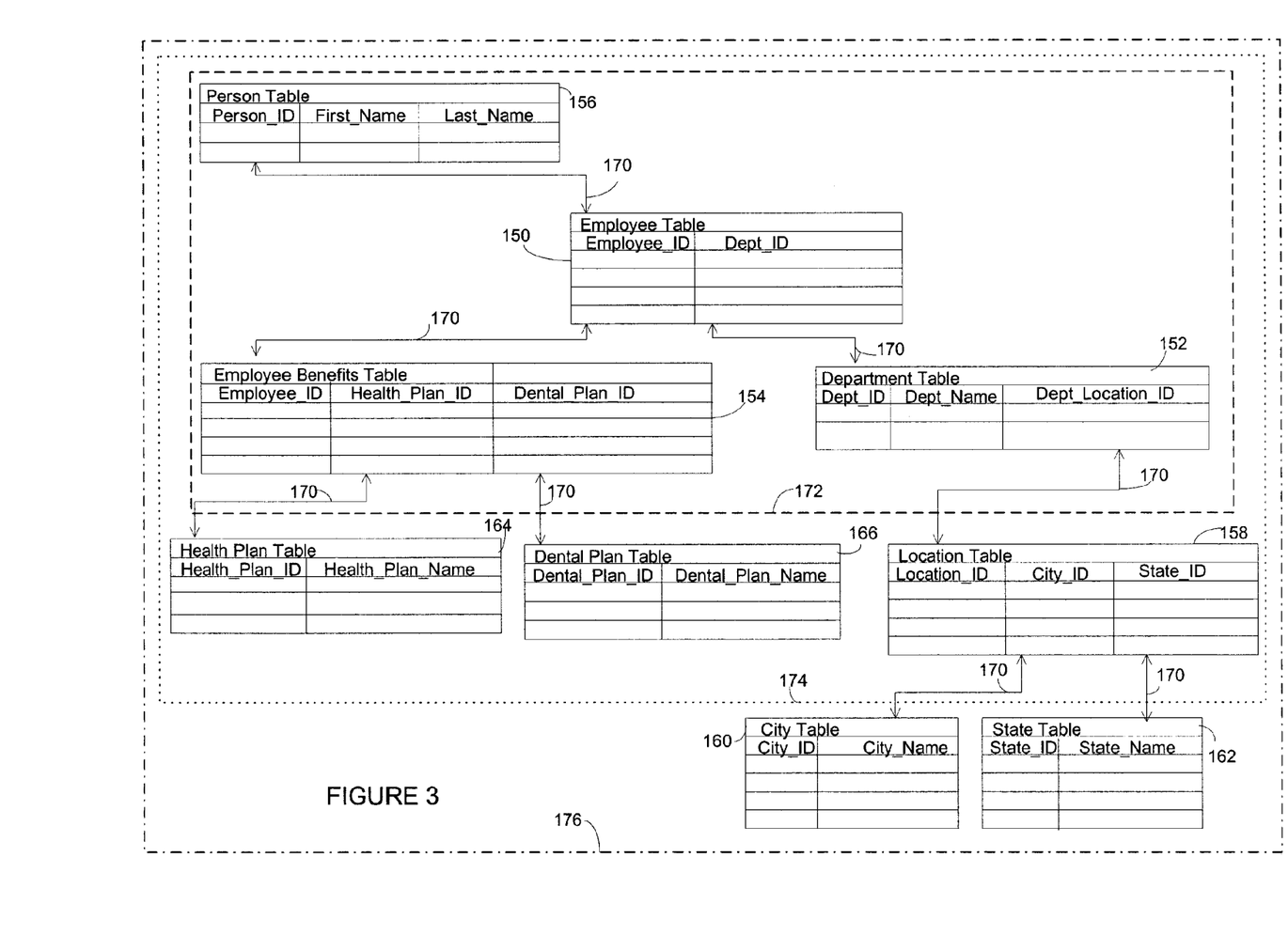
FIG. 3 is a diagram representing tables in an exemplary database.

FIG. 3 depicts a portion of the tables located in an exemplary relational database. As shown, the exemplary database comprises employee table 150, department table 152, employee benefits table 154, person table 156, location table 158, city table 160, state table 162, health plan table 164, and dental plan table 166. Arrows 170 represent relationships that exist between tables.

Generally, data regarding the structure and layout of database tables is stored in the database. For example, relationship data identifying which tables are related to others is stored in the database. Likewise format data which defines the structure of the tables is stored in the database. In some database systems, relationship data and format data is stored in an area of the database referred to as the database schema.

It should be emphasized that the database tables illustrated in FIG. 3 may comprise only a portion of the tables in a database. Indeed it is likely that numerous other tables may exist in the database. It should also be noted that tables in a database can be said to have different levels of relation to one another. For example, person table 156, employee benefits table 154, and department table 152 are all directly related to employee table 150. In other words tables 156, 154, and 152 can be said to be within one level of relation to the table 150. Boundary line 172 identifies that tables 152, 154, and 156 fall within this first level of relation to employee table 150. Health plan table 164 and dental plan table 166, both of which are directly related to employee benefits table 154, and location table which is directly related to department table 152, can be said to be within a second level of relation to employee table 150. Boundary line 174 designates that location table 158, dental plan table 166, health plan table 164, person table 156, employee benefits table 154, and department table 152 all fall within two levels of relation to employee table 150. City table 160 and state table 162 are related to location table 158. Tables 160 and 162 along with tables 152, 154, 156, 158, 164, and 166 fall within three levels of relation to employee table 150 as designated by line 176.

As previously noted, control and management of the database tables is maintained by a DBMS, e.g., a RDBMS. An architecture for an exemplary RDBMS 90 is graphically depicted in FIG. 4. The architecture comprises essentially three layers. Layer one provides for three classes of integration with the RDBMS, comprising: (1) a SQL Server Enterprise Manager 92 that provides a common environment for managing several types of server software in a network and provides a primary interface for users who are administering copies of the RDBMS on the network; (2) an Applications Interface 93 that allows integration of a server interface into user applications such as Distributed Component Object Modules (DCOM); and (3) a Tools Interface 94 that provides an interface for integration of administration and configuration tools developed by Independent Software Vendors (ISV).

Layer two opens the functionality of the RDBMS to other applications by providing three application programming interfaces (API): SQL Namespace 95, SQL Distributed Management Objects 99, and Data Transformation Services 100. A user interface 91 is provided by Wizards, HTML, and so on. User interface 91 may comprise a "database designer" 93 for providing the functionality described below with reference to FIGS. 5 through 7. SQL Namespace API 95 exposes the user interface (UI) elements of SQL Server Enterprise Manager 92. This allows applications to include SQL Server Enterprise Manager UI elements such as dialog boxes and wizards.

Figure 4:
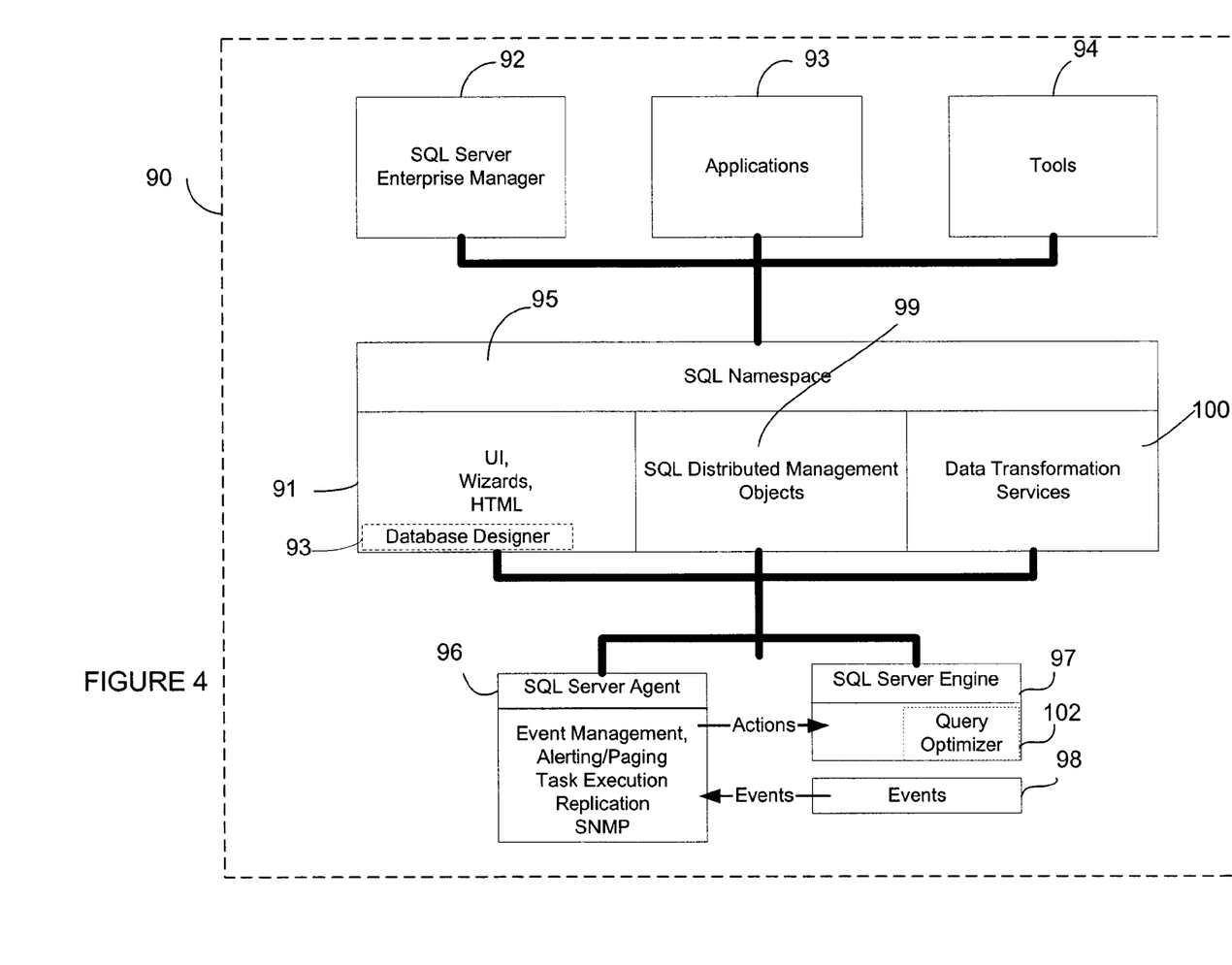
FIG. 4 is a graphical depiction of an architecture for an exemplary RDBMS.

SQL Distributed Management Objects API 99 abstracts the use of DDL, system stored procedures, registry information, and operating system resources, providing an API to all administration and configuration tasks for the RDBMS.

Distributed Transformation Services API 100 exposes the services provided by the RDBMS to aid in building data warehouses and data marts. These services provide the ability to transfer and transform data between heterogeneous OLE DB and ODBC data sources. Data from objects or the result sets of queries can be transferred at regularly scheduled times or intervals, or on an ad hoc basis.

Layer three provides the heart of the RDBMS. This layer comprises a SQL Server Engine 97 and a SQL Server Agent 96 that monitors and controls SQL Server Engine 97 based on Events 98 that inform SQL Server Agent of the status of the SQL Server Engine 97. Server Engine 97 processes SQL statements, forms and optimizes query execution plans, and so on. Server Engine 97 may comprise a component referred to as "query optimizer" 102 which operates to select execution plans.

As previously noted, due to the number of database tables in some databases and the complexity of relationships between tables, database diagrams can be become unwieldy and confusing. For this reason, it is often more useful to view selected portions of a database diagram. Existing database diagramming tools provide the capability to build a database diagram for an entire database but do not provide for automatic generation of selected neighborhoods of tables.

DETAILED DESCRIPTION OF AUTO-GENERATION OF TABLE NEIGHBORHOODS

According to the present invention, a database management system provides the capability to select one or more database tables, specify a level of relation for each of the selected tables for which tables ought to be included in the database diagram, and automatically generate a database diagram depicting the one or more selected tables and any tables falling within the selected level of relation to the selected table.

Figure 5:
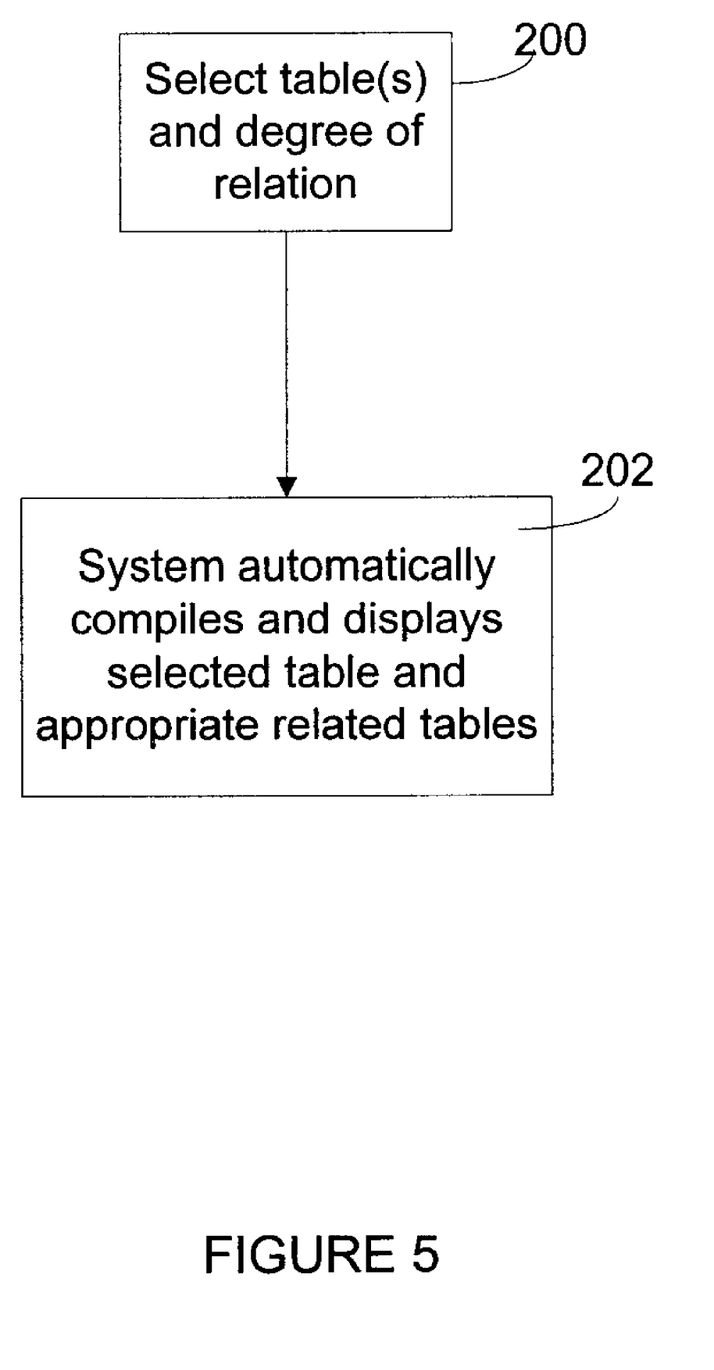
FIG. 5 is a flow diagram of a process for generating a database diagram.

FIG. 5 provides an overview of a process in accordance with the present invention for creating a database diagram for a selected neighborhood of tables. As shown, at step 200 a user selects a database table for which it is desired to have a database diagram created. Additionally, a user specifies the level of relation to the selected table, e.g. one, two, three, etc., that tables should fall within in order to be included in the database diagram. In some embodiments of the invention, it may be possible to specify multiple tables for which neighborhoods of tables ought to be created and displayed on one database diagram. At step 202 a database system in accordance with the present invention automatically compiles and displays the selected table(s), the appropriate related tables, and the relationships between the displayed tables.

Figure 6:
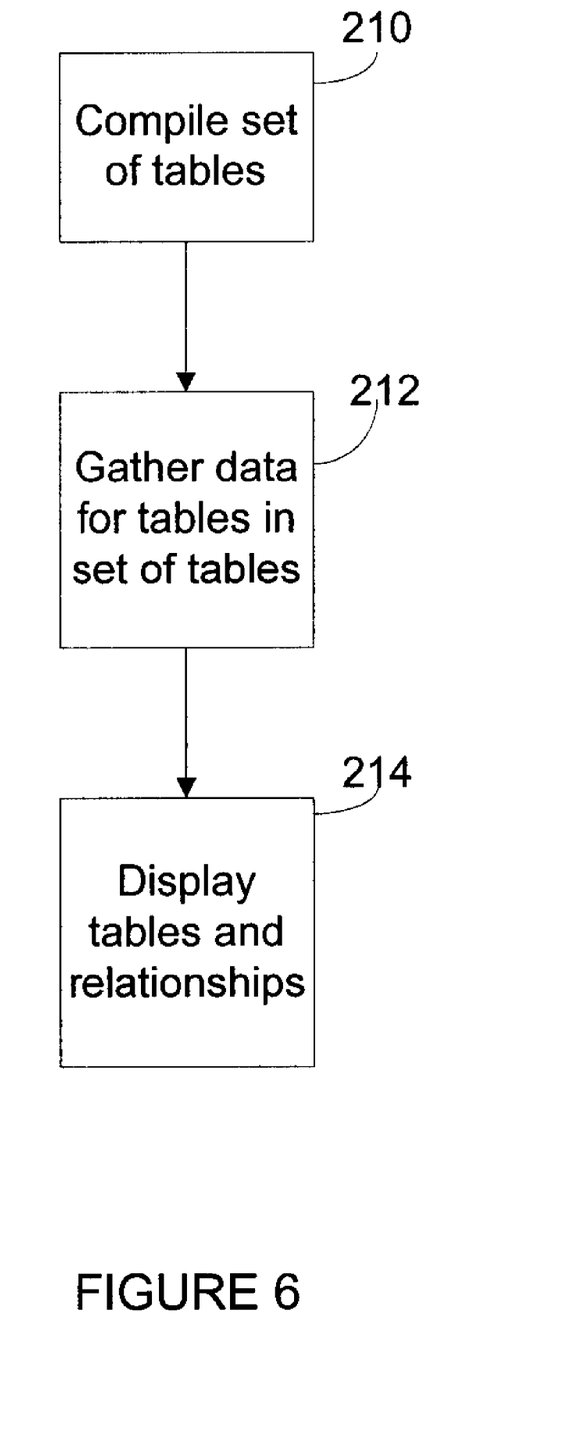
FIG. 6 is a flow diagram of a process for compiling and displaying a database diagram.

FIG. 6 provides a detailed view of the process represented by step 202 of FIG. 5. As shown, at step 210, the set of tables having the desired relationship to the selected table is compiled. For example, if a database diagram was requested for tables within one level of relation to the selected table, at step 210 the set of tables with this characteristic is compiled. Similarly, if a database diagram was requested for tables within two levels of relation to the selected table, at step 210 the set of tables with this characteristic is compiled. Generally, step 210 is accomplished by querying the database. In one embodiment, the database schema is queried for this data.

At step 212 format data is gathered from the database for the selected table and each table falling within the set of related tables compiled at step 210. In one embodiment, format data is gathered from the database schema. Format data comprises data such as the names of the columns in a table, the data type of the data stored in each table column, and the width of each column. At step 214 using the data gathered at step 212, a graphical representation of the selected table and the tables in the set generated at step 210 are displayed.

Figure 7:
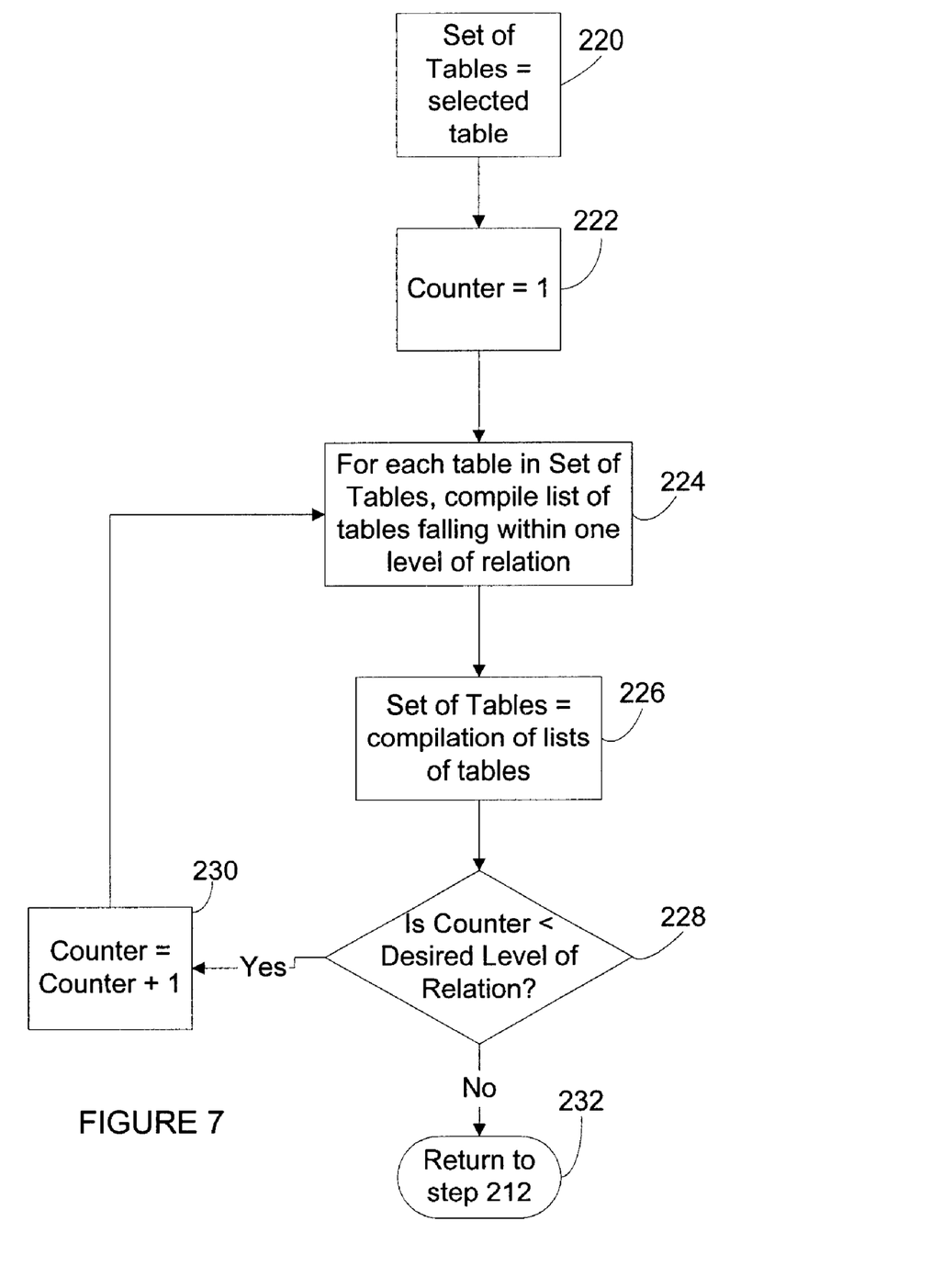
FIG. 7 is a flow diagram of a process for compiling a set of tables.

FIG. 7 provides a detailed view of one method in accordance with the present invention for completing step 210 above. As shown, at step 220 the set of tables which are to be included in the database diagram, referred to here as "Set of Tables" is initialized to include the table selected by the user. At step 222 a counter variable is initialized to 1. At step 224 for each table identified in the current "Set of Tables," a list is compiled of the tables falling within one level of relation. At step 226 the "Set of Tables" is defined to include the tables that were compiled at step 224. At step 228 it is determined whether the counter variable is equal to the desired level of relation to the selected table that was defined by the user at step 200. If so, at step 232, control returns to step 212 of FIG. 6. If the counter is not equal to the desired level of relation, at step 230 the counter is incremented by one and thereafter control is returned to step 224 where additional tables are compiled for inclusion in the "Set of Tables."

Figure 8A:
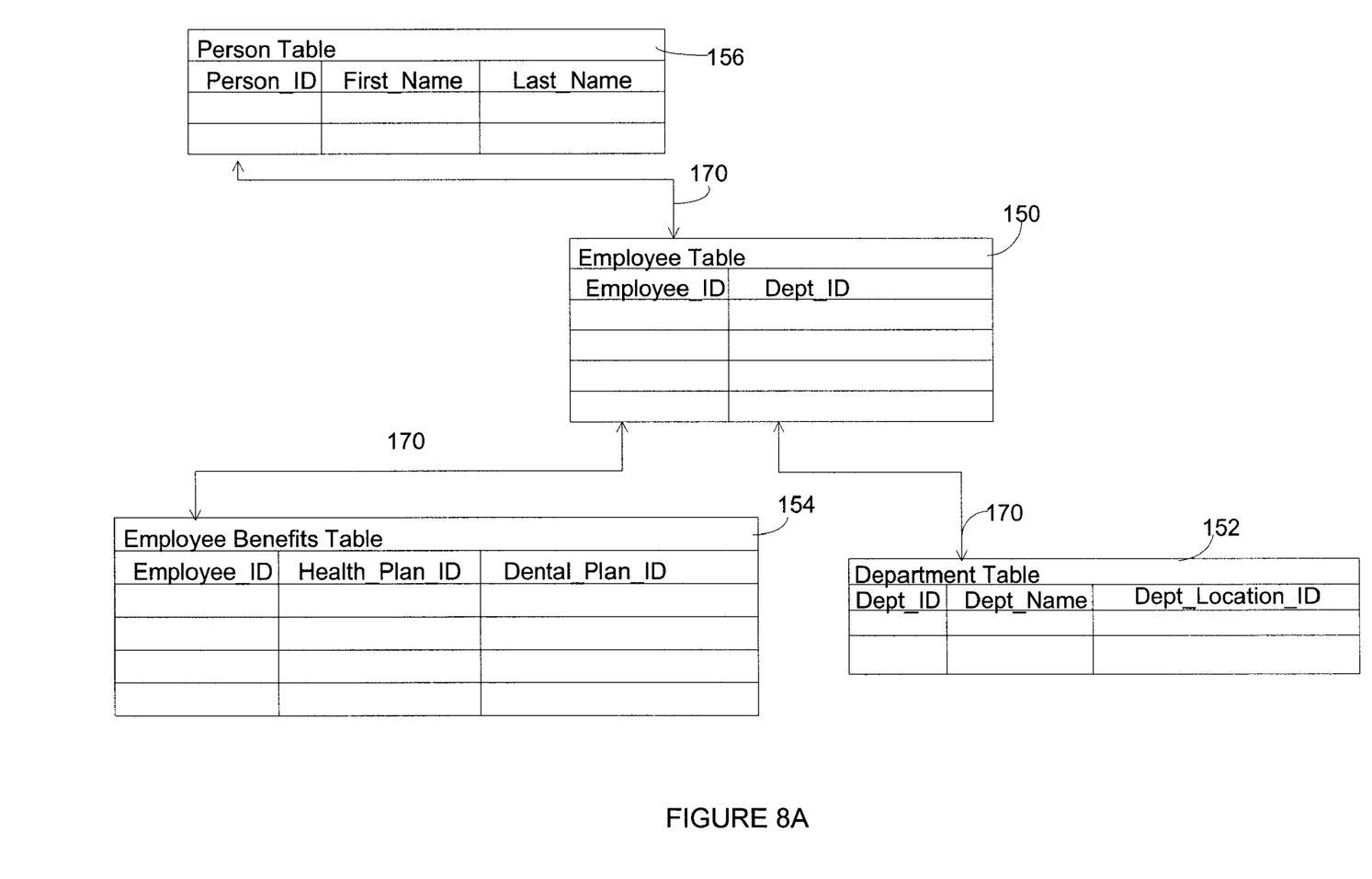
FIG. 8A is an exemplary database diagram.

FIG. 8A provides a view of an illustrative database diagram which might be generated using a database designer system and methods in accordance with the present invention. More specifically there is shown in FIG. 8A, a database diagram formed from the database shown in FIG. 3. As shown, employee table 150 and tables 152, 154, and 156, all of which are directly related to the employee table, i.e. all tables within one level of relation of employee table, are included in the diagram. Relationships 170 between tables 150, 152, 154, and 156 are likewise shown.

Figure 8B:
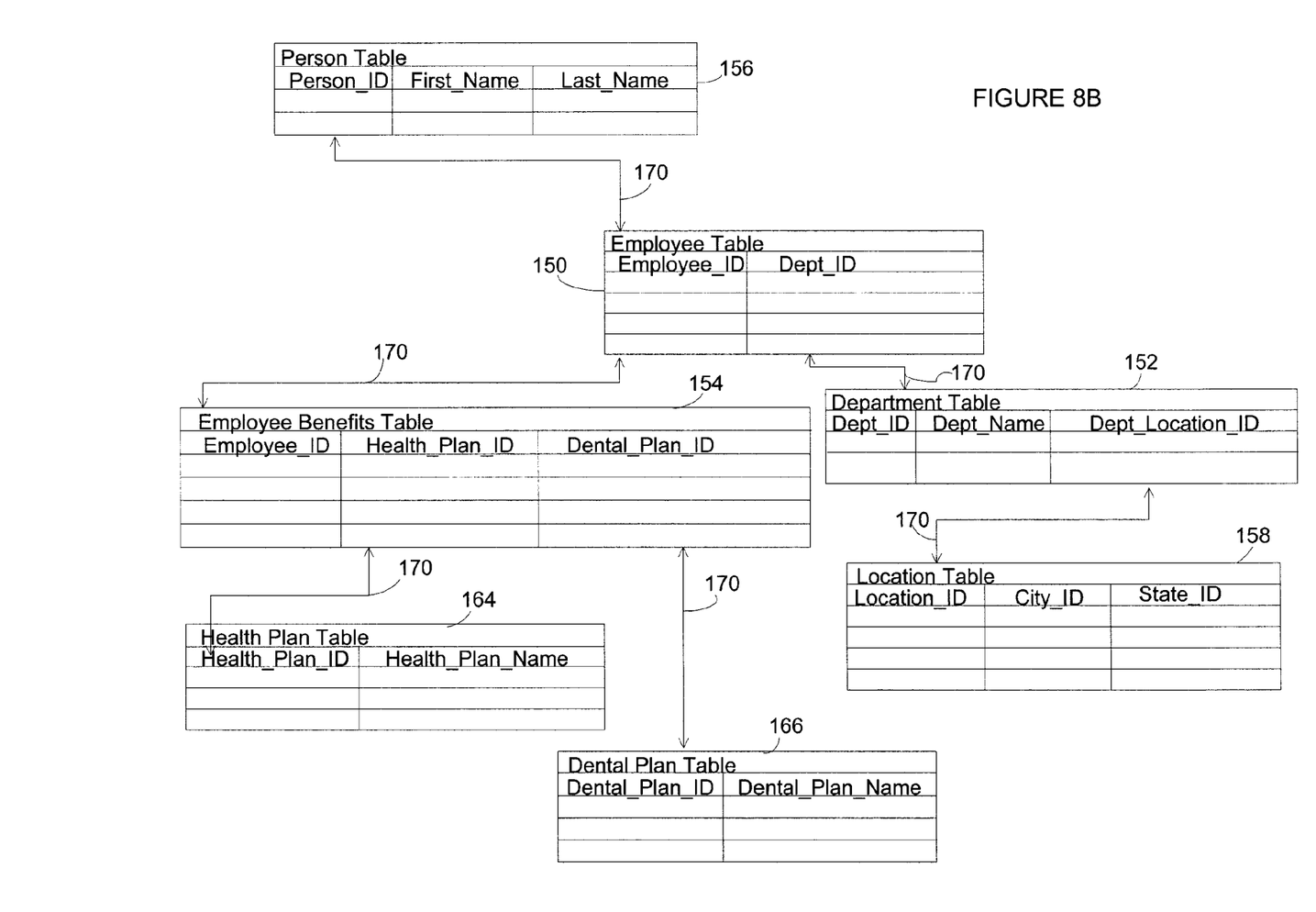
FIG. 8B is an exemplary database diagram.

A database diagram showing tables within two levels of relation to employee table 150 could likewise be developed according to the present invention. As shown in FIG. 8B, person table 156, employee benefits table 154, department table 152, health plan table 164, dental plan table 166, and location table 158, all of which fall within two levels of relation to employee table 150 are included in the database diagram.

Figure 8C:
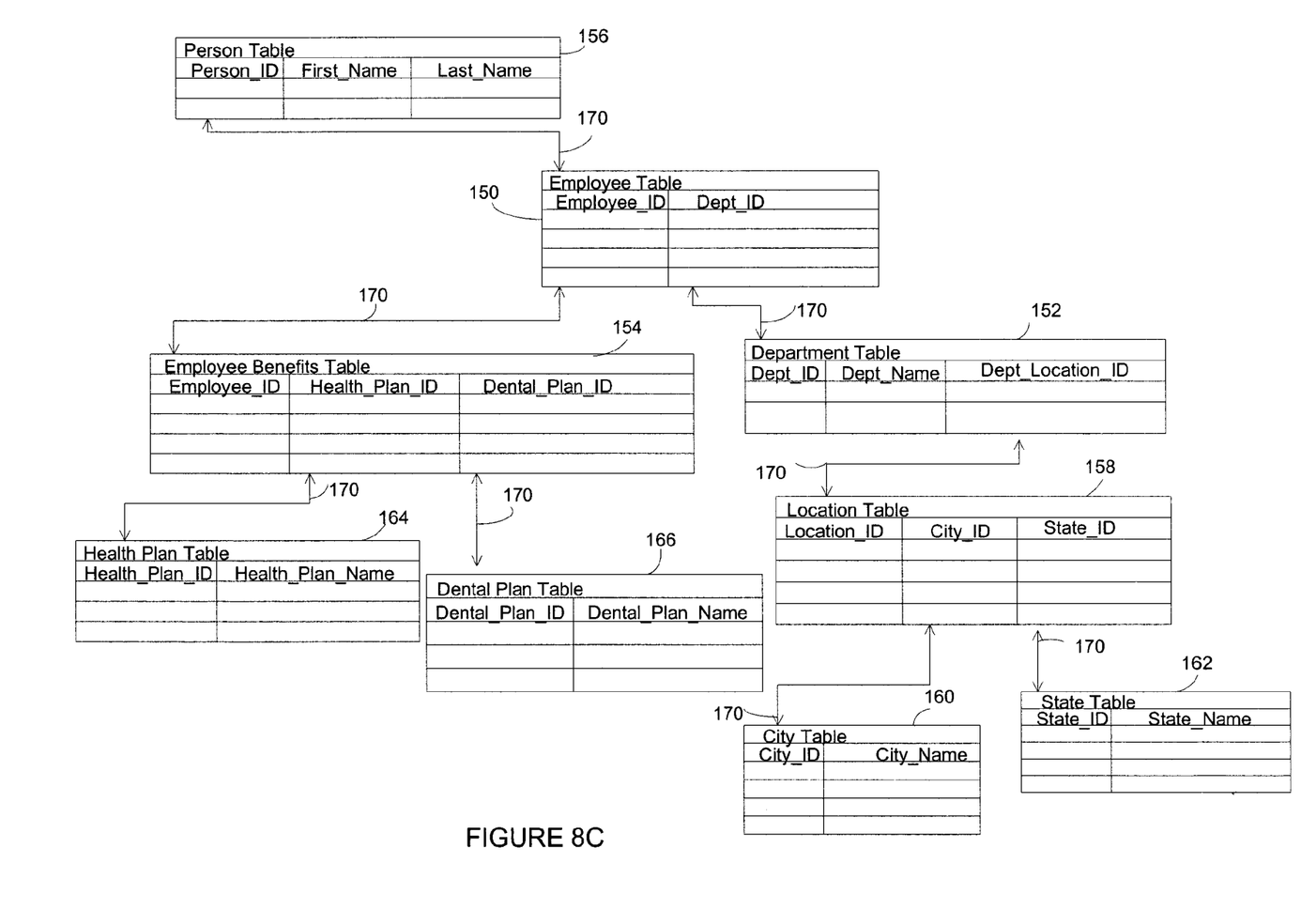
FIG. 8C is an exemplary database diagram.

A database diagram such as that shown in FIG. 8C, displaying tables within three levels of relation to employee table 150 could similarly be generated. Indeed, a database diagram depicting tables falling within any level of relation to the selected table could be shown.

Thus, as described above, the present invention provides systems and methods for automatically generating database diagrams for selective database tables. Accordingly, the present invention provides developers the ability to automatically view neighborhoods of database tables.

Those skilled in the art understand that computer readable instructions for performing the above described processes can be generated and stored on a computer readable medium such as a magnetic disk or CD-ROM. Further, a computer such as that described with reference to FIG. 1 may be arranged with other similarly equipped computers in a network, and each computer may be loaded with computer readable instructions for performing the above described processes. Specifically, referring to FIG. 1, microprocessor 21 may be programmed to operate in accordance with the above described processes.

While the invention has been described and illustrated with reference to specific embodiments, those skilled in the art will recognize that modification and variations may be made without departing from the is principles of the invention as described above and set forth in the following claims. In particular, the invention may employed with any type of database including those not in relational format. Further, the invention may be employed in any database that comprises data regarding the relationships between tables. Additionally, a database diagram may be generated for two or more selected tables simultaneously. Accordingly, reference should be made to the appended claims as indicating the scope of the invention.

What is claimed is:

1. A database management system for managing data in a database, comprising: a database designer for creating a database diagram of tables in the database, wherein said database designer automatically displays a selected database table and related database tables having a selected level of relation with the selected database table.

2. The database management system of claim 1 wherein said database designer searches the database for tables having a relationship to the selected table; retrieves format data related to the selected table and each table having a relationship to the selected table; and displays the selected table and each table having a relationship to the selected table.

3. The database management system of claim 1, wherein said database designer compiles a set of related tables having a relationship to the selected table; retrieves format data about the selected table and each table in the set of related tables; and displays the selected table, each table in the set of related tables, and relationships between the selected table and each table in the set of related tables.

4. A database management system for managing data in a database, comprising: computer-executable instructions for searching a database for tables having a relationship to the selected table; computer-executable instructions for formatting data related to the selected table and each table having a relationship to the selected table; and computer-executable instruction for automatically displaying the selected table and each table having a relationship to the selected table.

5. A database management system for managing data in a database, comprising: computer-executable instruction for compiling a set of related tables having a relationship to a selected table; computer-executable instruction for retrieving format data about the selected table and each table in the set of related tables; and computer-executable instruction for automatically displaying the selected table, each table in the set of related tables, and relationships between the selected table and each table in the list of related tables.

6. A method for creating a database diagram for a selected table, comprising the following steps: searching a database for tables having a relationship to the selected table; retrieving format data related to the selected table and each table having a relationship to the selected table; automatically displaying the selected table, each table having a relationship to the selected table, and relationships between the selected table and each table having a relationship to the selected table.

7. The method of claim 6, wherein said step of searching a database for tables having a relationship to the selected table comprises searching a database schema for tables defined in the schema as having a relationship to the selected table.

8. The method of claim 6, wherein said format data comprises column name, column character type, and column width.

9. A computer-readable media having stored thereon computer-executable instructions for performing the steps recited in claim 6.

10. A method for creating a database diagram for a selected table, comprising the following steps:
compiling a set of related tables having a relationship to the selected table;
retrieving format data about the selected table and each table in the set of related tables; and
automatically displaying the selected table, each table in the set of related tables, and relationships between the selected table and each table in the set of related tables.

11. The method for creating a database diagram of claim 10, wherein said step of compiling a set of tables comprises: searching the database for tables within a defined level of relation with the selected table.

12. The method for creating a database diagram of claim 11, wherein said step of searching the database for tables having a relationship to the selected table comprises searching a database schema for tables defined in the schema as having a relationship to the selected table.

13. The method for creating a database diagram of claim 10, wherein the format data comprises column name, column character type, and column width.

14. The method for creating a database diagram of claim 10, wherein the defined level of relation is one level of relation.

15. The method for creating a database diagram of claim 14, wherein the defined level of relation is two levels of relation.

16. The method for creating a database diagram of claim 14, wherein the defined level of relation is three levels of relation.

17. The method for creating a database diagram of claim 14, wherein the defined level of relation is defined by human input.

18. A computer-readable media having stored thereon computer-executable instructions for performing the steps recited in claim 10.

19. A method for creating a database diagram for a plurality of selected tables, comprising the following steps:
searching a database for tables having a relationship to at least one of the plurality of selected tables;
retrieving format data for each of the plurality of selected tables and each table having a relationship to at least one of the plurality of selected tables; and
automatically displaying each of the plurality of selected tables, each table having a relationship to at least one of the plurality of selected tables, and relationships between the plurality of selected tables and each table having a relationship to at least one of the plurality of selected tables.

20. The method of creating a database diagram of claim 19, wherein said plurality of selected tables is two tables.

21. A computer-readable media having stored thereon computer-executable instructions for performing the steps recited in claim 19.

* * * * *